G. BEAUMONT.
PATTERN MECHANISM FOR WEAVING.
APPLICATION FILED JULY 10, 1907.
956,510.
Patented May 3, 1910.
2 SHEETS—SHEET 1.
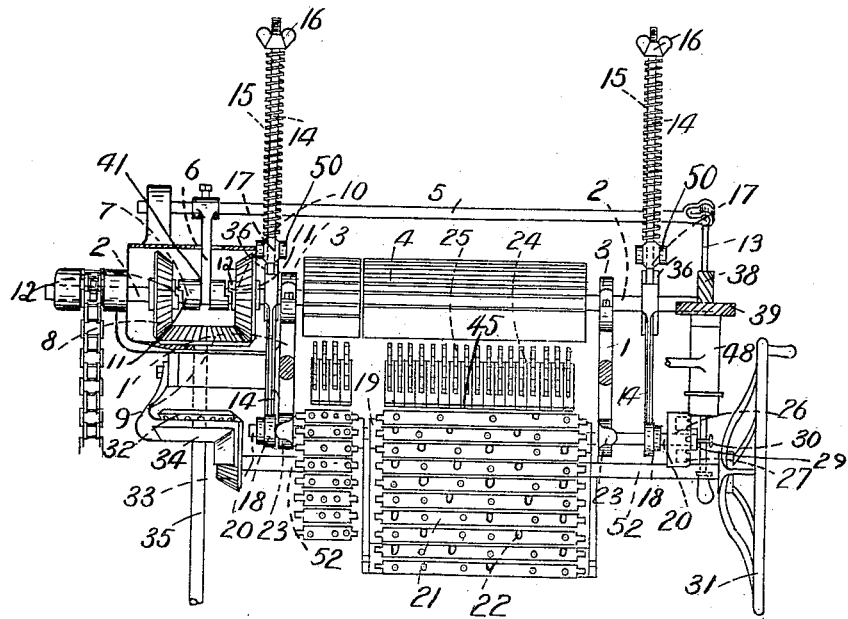
WITNESSES
W. P. Burk
INVENTOR
GEORGE BEAUMONT G. BEAUMONT.
PATTERN MECHANISM FOR WEAVING.
APPLICATION FILED JULY 10, 1907.
956,510.
Patented May 3, 1910.
2 SHEETS—SHEET 2.
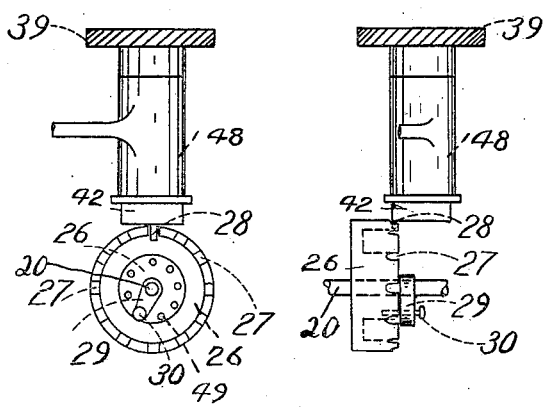
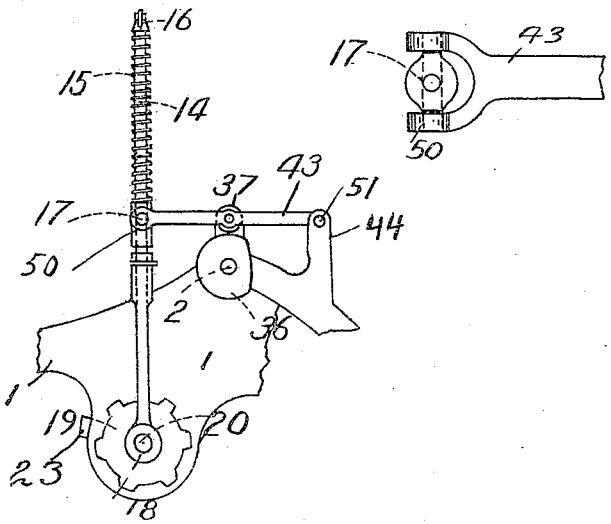
WITNESSES
INVENTOR
GEORGE BEAUMONT
ATTY.

UNITED STATES PATENT OFFICE.

GEORGE BEAUMONT, OF DUNEDIN, NEW ZEALAND, ASSIGNOR OF ONE-HALF TO ROBERT GLENDINING, OF DUNEDIN, NEW ZEALAND.

PATTERN MECHANISM FOR WEAVING.

956,510.  Specification of Letters Patent.  Patented May 3, 1910.

Application filed July 10, 1907. Serial No. 383,094.

*To all whom it may concern:*

Be it known that I, GEORGE BEAUMONT, subject of Great Britain, residing at Dunedin, New Zealand, have invented new and useful Improvements in Pattern Mechanism for Weaving, of which the following is a specification.

This invention relates to looms for weaving cloth and similar materials and particularly to loom mechanism disclosed in United States Patent #561933, dated June 9, 1896.

The object of this invention is to provide simpler, cheaper, and more efficient means of working the harness motion in looms of the class referred to, and the present improvements are specially designed for use with wooden lag and peg harness of the kind described in the above mentioned patent.

According to the present invention the reversing clutch is arranged at the top of the loom, thereby dispensing with part of the bevel gearing described in the said specification. A clutch is also provided whereby the lag cylinder spindle may be run loose, so that the harness can be pulled back by hand for resetting without reversing the loom. A yielding support is also provided for the lag cylinder spindle so as to prevent possible breakage in the event of a peg jamming.

The invention consists in the features and combination and arrangement of parts hereinafter described and more particularly pointed out in the claim.

In the accompanying drawings illustrating the invention, similar numerals of reference indicate similar parts, and Figure 1 is an end view of portion of a loom showing the improvements. Fig. 2 is a side view of the same. Fig. 3 is an end view of the clutch for the lag cylinder spindle as mounted on the loom. Fig. 4 is a side view of the same. Fig. 5 is a side view of one of the vertical rods (14) supporting the lag cylinder spindle, showing the spring arrangement, the bearing for the lag cylinder spindle, and the cam action. Fig. 6 is a detail plan of the connection between lever (43) and vertical rod (14).

The main shaft (35), see Fig. 1, supported in a bracket or guard (34), is driven by the usual loom gearing, and has mounted at its upper end a bevel gear wheel (9), which gears into one of two other bevel gear wheels (8) and (10). These gear wheels (8) (10) run loosely on the spindle (2), which is journaled in bearings (3) on the main frame (1), and either may be brought into operation by means of the clutch (7) with teeth (11) at each end to engage with corresponding teeth (12) on the bevel wheels (8) and (10). The clutch (7) is connected to the spindle (2) by a feather, but is free to be moved laterally by the lever (6) secured to the connecting rod (5) which is operated by the hand lever (13), the fork of the lever (6) engaging a groove (41) on the clutch (7). By pulling the hand lever (13) out, the teeth (11) on the clutch (7) engage the corresponding teeth (12) on the bevel wheel (8) and by pulling the hand lever 13, in, the teeth on the other side of the clutch 7 engage the bevel wheel 10. This enables the spindle 2 to run either backward or forward. On the other end of the spindle (2) is keyed a gear wheel (38) which gears into another horizontal gear wheel (39) in the manner shown. The spindle carrying the gear wheel (39) revolves in a casing (48) supported on the main frame, and at its lower end it carries a disk (42), see Figs. 3 and 4, with a pin (28) projecting from it and adapted to engage cup shaped openings (27) in the rim of the dished wheel (26) running loose on one end of the lag cylinder spindle (20).

On the end of the spindle (20) is secured a collar (29) with a side extension carrying a spring pin (30) adapted to engage in one of a series of holes (49) in the boss of the dished wheel (26) so as to cause it to revolve the spindle (20) when itself revolved by the pin (28). The spring pin (30) is fitted in a slot in the collar (29) and the outer end of its shank next the knob is flattened so that when the pin is retracted and given a half turn the flattened portion bears on the outer surface of the collar (29) and holds the pin retracted from the slot. The lag cylinder spindle (20) can then run free. To engage the clutch the operation is reversed and the flattened portion of the pin (30) enters the slot in the collar and the pin engages one of the holes (49) in the boss of the dished wheel (26), thereby causing the lag cylinder spindle (20) to be driven from the gear wheels (38) (39).

The lag cylinder spindle (20) is carried in bearings (23) on the main frame (1) which are slotted to allow the spindle (20) a limited movement if anything jams. The spindle (20) is also yieldingly supported and steadied by the rods (14) the lower ends of which have bearings (18) in which the spindle (20) revolves. The rods (14) extend vertically upward and pass through the forked ends (50) of the levers (43), fulcrumed at (51) on a bracket (44) on the frame (1). These levers (43) have near their central part friction rollers (37) engaging the usual cams (36) keyed on the spindle (2). The rods (14) are pivotally secured within the forked ends (50) of the levers (43) by pivot pins (17) see Fig. 6 which are pivoted between the forked ends 50 of the levers 43 and have holes therein through which the rods are free to slide vertically. Spiral springs (15) are coiled on the rods (14) above the forked ends (50) of the levers (43) the springs being kept in position and adjusted by thumb screws (16) on the upper ends of the rods (14). This arrangement supports the lag cylinder spindle (20) and permits it to yield by compressing the springs (15) if a peg jams.

The spindle (20) carries the lag cylinder (19) around which the lags (21) revolve. These lags (21) have the usual hardwood pegs (22) which come in contact with the projections (45) on the vibrators (24) which have mounted thereon the usual gear wheels (25) with pin (46) working in slot (47) which on the pegs (22) coming in contact with the projections (45) engage with the teeth of the cylinder (4) to operate the connectors (40) in the usual manner and as shown and described in Letters Patent #561,933 granted June 9, 1896 for looms. The hand wheel (31) is keyed on the spindle (52) journaled in bearings on the main frame (1) and is adapted to actuate the pattern mechanism by the bevel gear wheel (33) on the spindle (52) engaging the bevel gear wheel (32) on the main shaft (35).

Having now described my invention, what I claim as new and desire to secure by Letters Patent is:—

In a loom of the class described, a lag cylinder spindle a main frame provided with slotted bearings for the lag cylinder spindle, a pair of vertical rods provided with bearings at their lower ends for the lag cylinder spindle, brackets on said frame, levers fulcrumed at one end on said brackets, the other ends of said levers embracing said vertical rods with a pivotal sliding connection, spiral springs coiled on said rods above said other ends of the levers, and wing nuts at the upper ends of said rods to retain and adjust said springs, substantially as described.

In testimony whereof I have signed my name to this specification in the presence of two subscribing witnesses.

GEORGE BEAUMONT.

Witnesses:
ANDREW JOHN PARK,
JOHN RUTHERFORD PARK.